United States Patent [19]
Perrin

[11] Patent Number: 5,887,857
[45] Date of Patent: Mar. 30, 1999

[54] GAS SPRING

[75] Inventor: Etienne Perrin, Pirey, France

[73] Assignee: Draftex Industries Limited, Edinburgh, Scotland

[21] Appl. No.: 713,039

[22] Filed: Sep. 12, 1996

[30] Foreign Application Priority Data

Oct. 9, 1995 [GB] United Kingdom ............... 9520574

[51] Int. Cl.⁶ ........................................... F16F 5/00
[52] U.S. Cl. ........................... 267/64.12; 188/322.19; 267/124
[58] Field of Search ............... 267/64.12, 64.26, 267/64.15, 120, 124; 188/322.19, 300, 310, 322.15, 288

[56] References Cited

U.S. PATENT DOCUMENTS

| | | | |
|---|---|---|---|
| 4,066,279 | 1/1978 | Kaptanis | 188/288 X |
| 4,113,220 | 9/1978 | Godwin et al. | 188/300 X |
| 4,595,182 | 6/1986 | Freitag et al. | 267/120 |
| 4,784,375 | 11/1988 | Wirges | 276/64.12 |
| 5,116,028 | 5/1992 | Mintgen et al. | 267/64.12 |
| 5,702,091 | 12/1997 | Perrin et al. | 267/64.12 |

FOREIGN PATENT DOCUMENTS

| | | |
|---|---|---|
| 0396906 | 11/1990 | European Pat. Off. . |
| 2376340 | 7/1978 | France . |
| 2652140 | 3/1991 | France . |
| 1528820 | 10/1978 | United Kingdom . |
| 2087510 | 5/1982 | United Kingdom . |

*Primary Examiner*—Robert J. Oberleitner
*Assistant Examiner*—Tyrone Lee
*Attorney, Agent, or Firm*—Leydig, Voit & Mayer, Ltd.

[57] ABSTRACT

A gas compression spring comprises a gas-filled cylinder in which a piston carrying a hollow piston rod is slidable and divides the interior of the cylinder into first and second chambers. Over part of the length of the cylinder, a groove is provided in the cylinder wall. Gas pressure within the cylinder causes the piston to drive the piston rod outwards of the cylinder, this being permitted by the groove which allows transfer of gas pressure between the two chambers. When the piston reaches the end of the groove, such gas pressure transfer ceases and movement of the piston rod stops. External manual force applied to a control rod, extending through the hollow interior of the piston rod, unseals an opening at the end of the piston rod which brings the two chambers into communication again. Gas pressure transfer can now take place between the two chambers via the interior of the piston rod. Movement of the piston rod outwardly of the cylinder under the pressure exerted by the gas now re-commences, but can be halted at any desired position by release of the force manually exerted on the control rod.

3 Claims, 3 Drawing Sheets

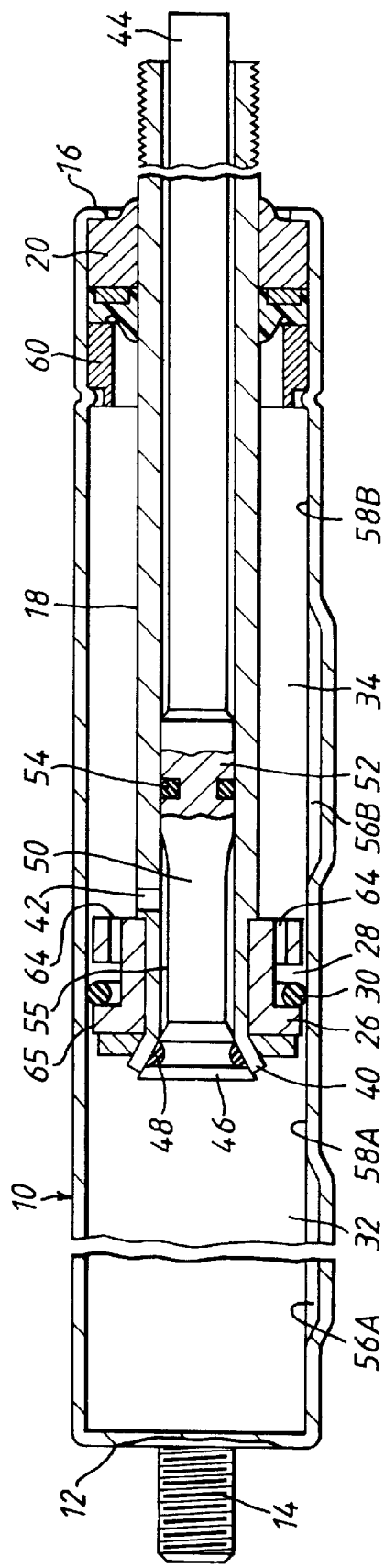
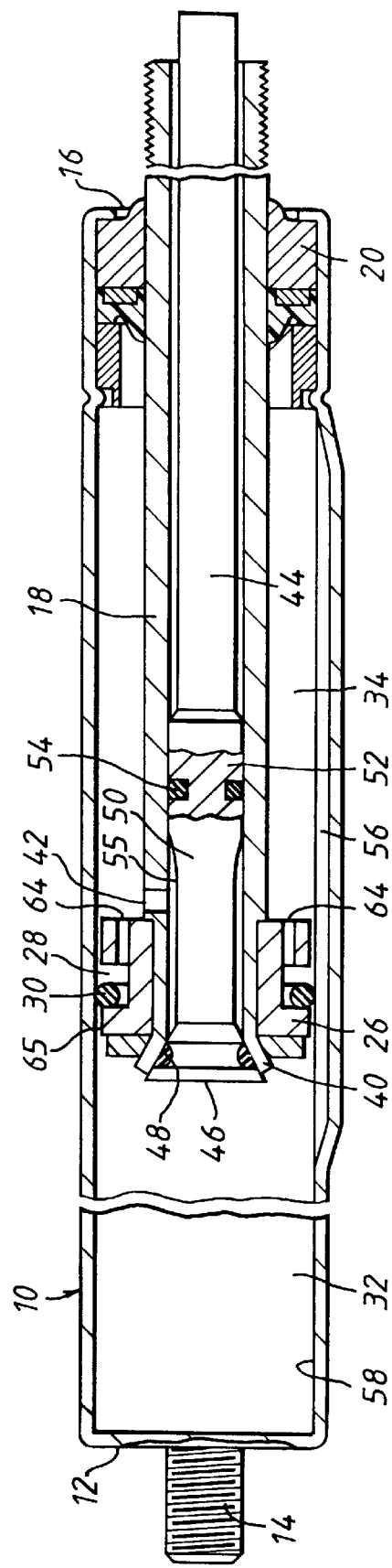
Fig. 2
Fig. 3

GAS SPRING

BACKGROUND OF THE INVENTION

The invention relates to gas springs.

Gas springs embodying the invention and to be described below by way of example can be used in motor vehicles for easing the opening of closure members such as luggage and engine compartment lids and hatchbacks. However, they can be used for other purposes.

A known form of gas spring comprises a gas compression spring for moving a member pivotted on a body from a first position corresponding to compression of the spring to a second position, comprising: an arrangement of a piston movable within cylinder means having first and second ends, the piston carrying a piston rod slidingly and sealingly extending outwardly of the first end of the cylinder means; means on the second end of the cylinder means and at a point on the piston rod where it extends from the cylinder means for connection between the body and the said member; the cylinder means being filled with gas under pressure and the piston dividing the interior of the cylinder means into a first chamber defined at least in part by the head of the piston and a second chamber through which the piston rod extends; the first and second chambers being interconnected by first gas flow means providing a first restricted gas flow path between points which are respectively situated in the first and second chambers and which are separated by respective predetermined parts, only, of the stroke of the piston, the restricted gas flow path permitting limited flow of gas from the second chamber to the first chamber as the gas pressure moves the piston over the said predetermined parts of the stroke and correspondingly moves the piston rod from an inner piston rod position towards an outer piston rod position more outwardly of the cylinder means, whereby to move the member towards the second position, the said limited flow of gas not being permitted when the piston is outside the said predetermined parts of its stroke so that further movement of the piston rod towards the outer piston rod position is stopped; and reverse flow means permitting gas pressure transfer between the first and second chambers when the piston rod is moved towards the inner piston rod position by an externally applied force.

Such a gas spring is known from United Kingdom patent specification No. 1,528,820. In this gas spring, the first gas flow means comprises two grooves in the interior wall of the cylinder means which extends longitudinally along the cylinder means and are separated by an ungrooved portion. As the piston rod travels towards the outer piston rod position, the piston travels over the first groove permitting limited flow of gas from the second chamber to the first chamber. When the piston reaches the ungrooved portion, piston rod movement stops. The piston rod can only be moved beyond this position, so that the piston then reaches the second groove which again permits restricted gas transfer, by the application of an externally applied force which has to be sufficient to overcome the gas pressure within the cylinder means. Th e invention aims to deal with this problem.

BRIEF SUMMARY OF THE INVENTION

Therefore, in accordance with the invention, the known gas spring is characterised by second gas flow means providing a second restricted gas flow path for controllably by-passing the piston when the piston is outside the predetermined parts of its stroke and thus providing a by-pass path connecting the first and second chambers; and control means operable from outside the cylinder means for switching the second gas flow means between a blocked condition in which gas flow through the second gas flow path is blocked and an unblocked position in which gas flow is permitted through the second gas flow path and allows the gas pressure to move the piston rod towards the outer piston rod position when the piston is outside the predetermined parts of its stroke.

Further according to the invention, there is provided a gas compression spring, comprising: an arrangement of a piston movable within cylinder means, the piston carrying a piston rod slidingly and sealingly extending outwardly of the cylinder means, the interior of the cylinder means being filled with gas under pressure and the piston dividing the interior of the cylinder means into a first chamber defined at least in part by the head of the piston and a second chamber through which the piston rod extends; first piston by-pass means comprising means continuously interconnecting points in the first and second chambers which are separated by a predetermined part, only, of the stroke of the piston, whereby to allow transfer of gas pressure from the second chamber to the first chamber as the gas pressure in the first chamber moves the piston over the said predetermined part of the stroke and moves the piston rod from an inner piston rod position towards an outer piston rod position more outwardly of the cylinder means, and whereby gas pressure transfer can no longer take place through the bypass means when the piston has moved outside the predetermined part of the stroke and movement of the piston and piston rod thus ceases; gas flow control means operable from outside the cylinder means and switchable between a first condition in which it permits gas pressure transfer between the first and second chambers when the piston is outside the predetermined part of the stroke, so as to allow the gas pressure to move the piston rod towards the outer piston rod position, and a second condition in which it blocks such gas pressure transfer; and reverse flow means permitting gas pressure transfer between the first chamber and the second chamber when the piston rod is moved towards the inner piston rod position by an externally applied force.

DESCRIPTION OF THE DRAWINGS

FIG. 2 is a longitudinal section through a modified form of the gas spring of FIG. 1;

FIG. 3 is a longitudinal section through another modified form of the gas spring of FIG. 1;

DESCRIPTION OF PREFERRED EMBODIMENTS

Figure 1:
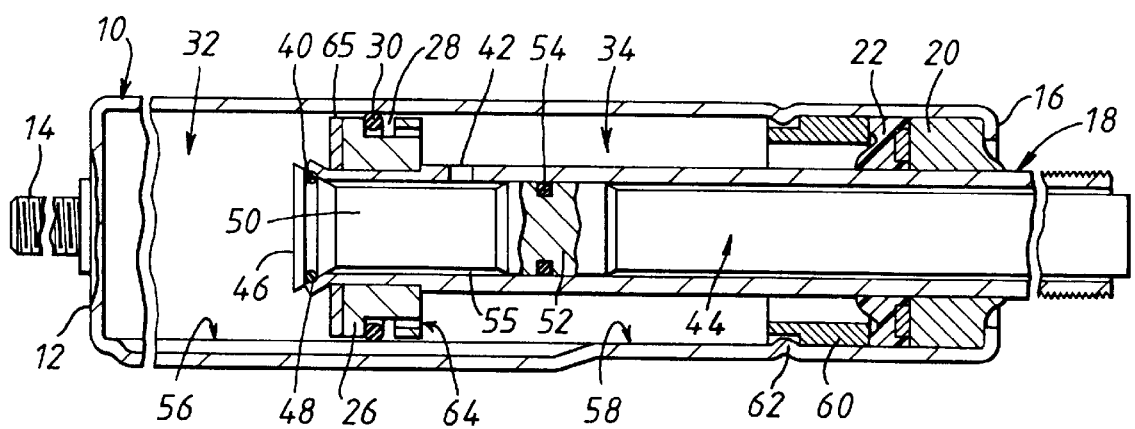
FIG. 1 is a longitudinal section through one of the gas springs.

Referring to FIG. 1, the gas spring comprises a cylindrical body 10 having a closed end 12 on which is mounted a fixture 14. The opposite end of the cylinder 10 is closed off by an integral wall 16 which is apertured to allow passage of a hollow piston rod 18. The piston rod 18 slides in a guide 20 and through an air-tight seal 22. The piston rod 18 is attached to a further fixture (not shown). In use, the gas spring is mounted on a vehicle body so as to control the pivotting movement of a horizontally pivotted closure member such as the hatchback, the lid of a luggage compartment, or the lid of the engine compartment. One of the fixtures (the fixture 14 or the fixture carried by the distal end of the piston rod 18) is attached to the body of a vehicle and the other is attached to the hatchback (or other movable member). The gas spring may, however, be used in many other applications.

Within the cylinder 10, the piston rod 18 is attached to a piston 26 which is provided with a circular groove 28 in which is located a sealing ring 30, the groove 28 being wider than the sealing ring 30. The piston 26 and the sealing ring 30 separate first and second chambers 32 and 34 within the cylinder 10.

The piston rod 18 is hollow and extends through the piston 26 to define an open end 40. A hole 42 in the piston rod 18 communicates with the chamber 34.

A control rod 44 extends slidably through the hollow interior of the piston rod 18 and protrudes into the chamber 32 through the aperture 40 in the piston rod, the control rod 44 terminating in a cap 46 which carries a sealing ring 48. A reduced-diameter portion 50 of the control rod 44 extends between the cap 46 and an enlarged region 52 which carries a sealing ring 54. A passage-way 55 is defined between the outside of the enlarged region 52 of the control rod 44 and the inside wall of the piston rod 18. Sealing ring 54 makes an airtight seal with the interior wall of the hollow piston rod 18.

Along a portion of its interior wall, the cylinder 10 is provided with a groove 56. Along another portion 58, however, of the interior wall of the cylinder, there is no such groove.

The airtight seal 22 is held in position by a ring 60 which is itself locked into the cylinder 10 by a circumferential shoulder 62.

The whole of the hollow interior of the cylinder 10 is filled with gas under pressure.

When the hatchback (or other closure member) is unlatched and lifted slightly, the gas pressure within the gas spring acts on the cross-section of the piston rod 18 and drives it and the piston 26 in a direction outwardly of the cylinder 10, thus raising the hatchback. During the consequential initial movement to the right (as viewed in FIG. 1) of the piston 26, gas can transfer from chamber 34 to chamber 32 through the groove 56, the cross-sectional size of the groove controlling the speed of movement of the piston. During this movement of the piston, the frictional force between the sealing rings 30 and the wall of the cylinder holds the sealing ring in the position shown in FIG. 1, and gas entering a groove 64 from chamber 34 is blocked against further travel.

The gas pressure in chamber 32, acting on cap 46, causes the sealing ring 48 to make a gas-tight seal around the open end 40 of the hollow interior of the piston rod 18.

When the piston 26 has travelled sufficiently far to the right (as viewed in FIG. 1), the sealing ring 30 will be brought into contact with the un-grooved wall portion 58. Gas transfer between chamber 34 and chamber 32 is thus now blocked. The force exerted by the gas pressure on the piston 26 can no longer overcome the weight of the hatchback.

Further movement of the piston and the piston rod therefore now stops. A pressure difference thus exists between chambers 32 and 34 which holds the hatchback or other closure member in a partially open position against its weight.

However, if a manual force is exerted (by the user) on the control rod 44, so as to move it slightly to the left (as viewed in FIG. 1), the sealing ring 48 is moved away from the end 40 of the piston rod. Chamber 34 is thus placed in communication with chamber 32 via the aperture 42 and the annular passageway 55. Gas pressure transfer between chambers 34 and 32 now resumes. The spring therefore now exerts a force capable of lifting the hatchback. The piston 26 now continues its movement to the right (as viewed in FIG. 1), and the hatchback is lifted towards its open position.

If the user removes the force exerted on the control rod 44, the gas pressure within chamber 32 will cause the cap 46 and the sealing ring 48 to move back towards the end 40 of the piston rod so as to close off that end. Pressure transfer between chambers 34 and 32 thus stops again, and further movement of the piston rod, and thus the hatchback, stops.

In this way, unlatching of the hatchback causes the gas spring to open the hatchback to a predetermined intermediate position at which it stops. However, the user can cause the gas spring to re-start its opening movement, to lift the hatchback further, by applying a force to a control rod 44 as explained. The hatchback can then be caused to stop again, at any desired position, by removal of the force on the control rod.

In order to close the hatchback, the user applies a downward force on the hatchback. This increases the effective weight of the hatchback, thus overcoming the gas pressure acting on the piston 26. As the piston begins to move to the left, as viewed in FIG. 1, friction acting on the sealing ring 30 moves the sealing ring relatively to the right of the groove 28 as viewed in the Figure. Communication between chambers 32 and 34 is now established through passages 64, under the sealing ring 28 and thence through gap 65. Gas pressure can now transfer from chamber 32 to chamber 34 to facilitate lowering of the hatchback and movement of the piston 26 to the left as viewed in FIG. 1, Such gas transfer will of course take place even if the sealing ring 30 is in contact with the un-grooved wall portion 58: if the sealing ring 30 is overlying the groove 56, the latter no longer controls the gas flow.

Items in FIG. 2 correspond to those in FIG. 1 are similarly referenced.

The arrangement of FIG. 2 differs from the arrangement of FIG. 1 in that the interior wall of the cylinder 10 has a first groove 56A and a second, axially spaced, groove 56B. A first ungrooved portion 58A is positioned between the groove 56A and the groove 56B, and a second un-grooved portion 58B is positioned between the groove 56B and the exit end of the cylinder 10.

The operation of the gas spring of FIG. 2 is generally the same as for the gas spring of FIG. 1.

Thus, after the hatchback has been unlatched and lifted slightly, the gas pressure within the cylinder acts on the cap 46 of the piston rod to move the piston 26 along the groove 56A, the groove 56A allowing gas pressure transfer between chamber 34 and chamber 32. Movement of the piston, and thus the hatchback, stops when the sealing ring 30 comes into contact with the first un-grooved portion 58A. Movement of the piston (to the right as viewed in FIG. 2), and thus raising of the hatchback, can be re-started in the manner explained in conjunction with FIG. 1 by manual force on the control rod 44. This manual force moves the cap 46 and the sealing ring 48 away from the end 40 of the piston rod 18, allowing gas pressure transfer between chamber 34 and chamber 32 through aperture 42 and passage 55. This movement can be stopped by removing the force on the control rod 44, so as to allow the control rod to revert to the position illustrated. The hatchback can thus be stopped at any desired position while the sealing ring 30 is in contact with the un-grooved wall portion 58A.

When the piston has moved sufficiently far to the right (as viewed in FIG. 2) so that the sealing ring 30 comes into contact with the portion of the cylinder provided with the second groove 56B, uninterrupted movement of the piston to the right (as viewed in the Figure) continues, because gas pressure can now transfer from chamber 34 to chamber 32 via groove 56B. Again, the cross-sectional side of the groove 56B controls the speed of movement of the piston. When the piston has moved sufficiently far to the right so that the sealing ring 30 comes into contact with the second un-grooved portion 58B, gas pressure transfer between chambers 34 and 32 is once more stopped. The force exerted by the spring is therefore reduced and can no longer lift the hatchback. Movement of the piston, and thus of the hatchback, again stops. As before, however, movement of the piston to the right (as viewed in FIG. 2) can be re-started by the application of manual force on the control rod 44, in the manner explained. In this way, the piston can be arranged to stop at any desired position within the un-grooved portion 58B of the wall of the cylinder 10.

The hatchback is lowered by the application of a lowering force, the resultant movement to the left of the piston 26 causing the sealing ring 30 to shift to the right (as viewed in the Figure) of the groove 28, and gas pressure can then transfer between chamber 32 and chamber 34 via the bores 64 and gap 65, thereby facilitating lowering of the hatchback under its weight even if the sealing ring 30 is in contact with an ungrooved portion of the cylinder wall. In addition, of course, such gas pressure transfer takes place freely through groove 56B and 56A as the piston 26 passes over the grooved portions.

Items in FIG. 3 corresponding to those in FIGS. 1 and 2 are similarly referenced.

In the arrangement of FIG. 3, the positions of the groove 56 and the un-grooved portion 58 of the interior wall of the cylinder 10 are reversed. The un-grooved portion 58 is now adjacent the end 12 of the cylinder. Therefore, the piston 26 and the piston rod 18 are effectively locked at the innermost position within the cylinder 10. The sealing ring 30, acting on the un-grooved portion 58, prevents gas pressure transfer between chambers 34 and 32. Therefore, when the hatchback is unlatched, the gas spring cannot act to raise it. In order to raise the hatchback, the user has to apply manual force to the control rod 44, so as to move it slightly to the left (as viewed in the Figure). Sealing ring 48 therefore no longer seals the open end 40 of the piston rod 18. Gas pressure transfer can now take place between chamber 34 and chamber 32 through the aperture 42 and passageway 55. The piston 26 can thus start to move to the right, and the piston rod 18 thus starts to lift the hatchback. As before, the user can cause the raising movement of the hatchback to stop at any desired position, by releasing the manual force on control rod 44.

When the piston 26 reaches the groove 56, gas pressure transfer between chamber 34 and chamber 32 can freely take place through the groove 56 and movement continues until the hatchback is fully raised.

Lowering of the hatchback takes place in the manner already explained.

It will be appreciated that the arrangements of the grooved and un-grooved portions of the cylinder, as shown in FIGS. 1, 2 and 3, are merely examples of many different possible arrangements. For example, the arrangement shown in FIG. 3 could be further modified by arranging for an additional un-grooved portion of the cylinder wall to be provided Items in FIGS. 4 and 5 corresponding to those in FIGS. 1, 2 and 3 are similarly referenced.

Figure 4:
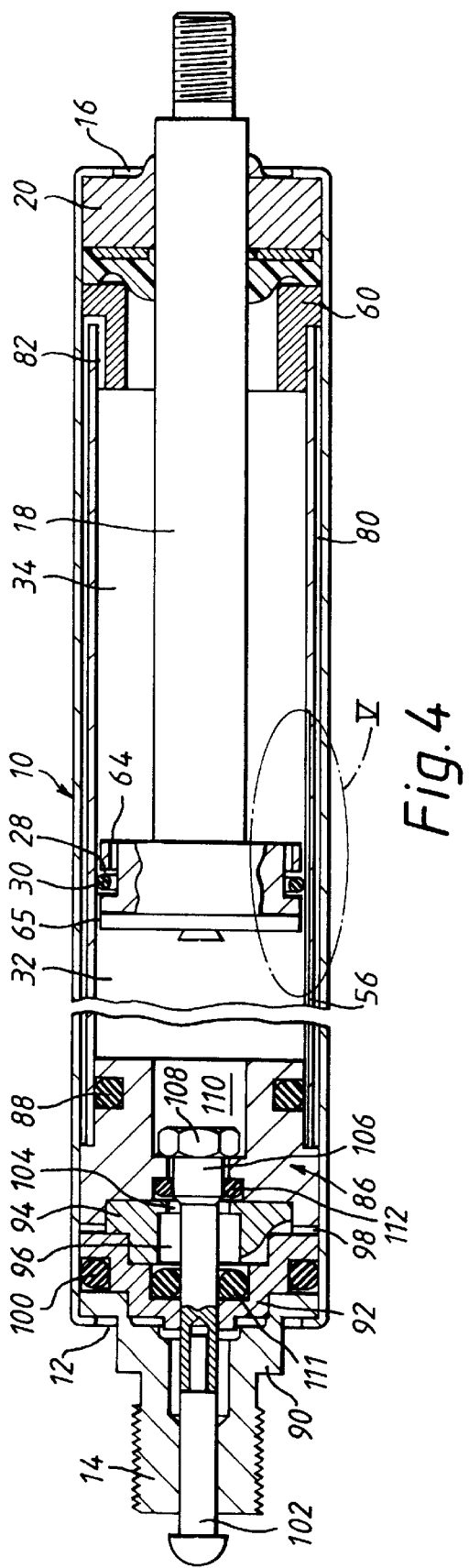
FIG. 4 is a longitudinal section through another one of the gas springs.
Figure 5:
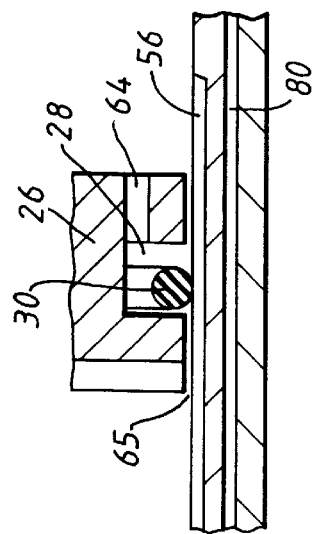
FIG. 5 shows, to an enlarged scale, parts of the gas spring of FIG. 4 in the region indicated by the arrow V in FIG. 4.

In the gas spring of FIGS. 4 and 5, the interior wall of the cylinder 10 not only has a groove 56 but it also has a concentric passageway 80 which extends over a substantial part of the length of the cylinder. The concentric passageway 80 is connected to the chamber 34 via a groove 82 in the fixing ring 60.

At its opposite end, the passageway 80 is connected to a valve arrangement indicated generally by the reference 84.

The valve arrangement 84 comprises a body 86 which is sealingly mounted within the interior of the cylinder by means of a sealing ring 88. The end of the cylinder 10 is closed off by a boss 90 carrying the fixture 14. Intermediate members 92 and 94 together define an intermediate chamber 96 which is connected to the concentric passageway 80 via a radial bore 98. Body portion 92 is sealed against the wall of the cylinder 10 by a sealing ring 100.

A control rod 102 extends slidingly through the body 90 and into and through the intermediate chamber 96. The control rod 102 passes through an opening 104 and has an enlarged portion 106 which is terminated by a nut 108 in a recess 110 which is in communication with the chamber 32. A sealing ring 111 seals around the stem of the control rod 102, and a further sealing ring 112 seals around the enlarged portion 106 of the control rod.

When the hatchback is unlatched and lifted slightly, the gas pressure within the gas spring causes the piston 26 and the piston rod 18 to move to the right as viewed in FIG. 4, thus lifting the hatchback. This movement takes place because gas pressure can transfer between chambers 34 and 32 via the groove 56 in the manner already explained with reference to the previous Figures.

However, when the piston reaches the un-grooved portion 58 of the cylinder, gas pressure transfer between chambers 34 and 32 stops. The hatchback is therefore arrested.

In order to enable the gas spring to raise the hatchback further, the user presses on the end of the control rod 102 so as to move the control rod to the right as viewed in FIG. 4. The enlarged portion 110 of the control rod 102 moves away from the sealing ring 112. Chamber 34 is now placed in communication with chamber 32 via groove 82, concentric passageway 80, radial bore 98, intermediate chamber 96, opening 104 and recess 110. The hatchback therefore starts to rise further. However, the operator can stop such further movement of the hatchback by releasing the force exerted on control rod 102. The control rod thus moves to the left again (as viewed in FIG. 4) under the action of the pressure within chamber 32, and further movement of the hatchback stops.

The hatchback can be lowered by applying a lowering force to it. The resultant movement of the piston 26 shifts the sealing ring 30 to the right hand side (as viewed in the Figure) of groove 28. Gas pressure transfer can take place between chambers 32 and 34 via the bores 64 and the gap 65.

In the valve arrangement 84 of FIG. 4 the enlarged portion 106 of the rod 102 produces a chamfer 114. Therefore, the pressure in the chamber 96 (acting through passageway 80 from chamber 34) produces a force acting on chamfer 114 tending to move the enlarged portion 106 out of the chamber 96. This force thus reduces the force which the user has to exert on the rod 102 to connect chamber 96 to chamber 32. In addition, if the user should attempt to lift the hatchback without moving the rod 102 to the released position, the resultant increased pressure in chamber 34 is able itself to move the enlarged diameter portion 106 out of the chamber 96, thus connecting chamber 34 to chamber 32. This reduces the pressure in chamber 34 which might otherwise damage the sealing ring 30.

In FIGS. 1,2 and 3, the same advantage can be obtained by increasing the area of the left hand end (as viewed in these Figures) of the passageway 55 relative to the area at its opposite end. The pressure in passageway 55 (from chamber 34) thus tends to push the cap 46 of the control rod 44 away from the sealing ring 48.

I claim:

1. A gas compression spring for moving a member from a first position corresponding to compression of the spring to a second position, comprising:

an arrangement of a piston movable along a longitudinal axis of and within hollow cylinder means having first and second ends, the piston having a head facing towards the first end of the cylinder means and carrying a piston rod slidingly and sealingly extending outwardly of the second end of the connection means;

connection means on the first end of the cylinder means and further connection means at a point on the piston rod where it extends from the cylinder means, one connection means being for connection to the body and the other connection means being for connection to said member;

the interior of the cylinder means being filled with gas under pressure and the piston dividing the interior of the cylinder means into a first chamber defined at least in part by the head of the piston and a second chamber through which the piston rod extends;

the first and second chambers being interconnected by first gas flow means providing a first restricted gas flow path between points which are respectively situated in the first and second chambers and which are separated by respective predetermined parts, only, of the stroke of the piston, the restricted gas flow path permitting limited flow of gas from the second chamber to the first chamber as the gas pressure moves the piston over the said predetermined parts of the stroke and correspondingly moves the piston rod from an inner piston rod position towards an outer piston rod position more outwardly of the cylinder means, whereby to move the member towards the second position, the said limited flow of gas not being permitted when the piston is outside the said predetermined parts of its stroke so that further movement of the piston rod towards the outer piston rod position is stopped;

one-way valve means permitting gas pressure transfer between the first and second chambers when the piston rod is moved towards the inner piston rod position by an externally applied force, the one-way valve means comprising sealing means carried by the piston and acting between the piston and the cylinder means and operative to provide a gas seal therebetween when the piston rod is moving outwardly of the cylinder means towards the outer piston rod position and to allow the passage of gas between the piston and the cylinder means when the piston rod is moving in the opposite direction;

second gas flow means providing a second restricted gas flow path for controllably by-passing the piston when the piston is outside the predetermined parts of its stroke and thus providing a by-pass path connecting the first and second chambers; and control means operable from outside the cylinder means and mechanically linked to the second gas flow means for switching the second gas flow means between a blocked condition in which gas flow through the second gas flow path is blocked and an unlocked position in which gas flow is permitted through the second gas flow path and allows the gas pressure to move the piston rod towards the outer piston rod position without externally applied force when the piston is outside the predetermined parts of its stroke.

2. A gas compression spring, comprising:

an arrangement of a piston movable longitudinally within and between first and second longitudinally spaced ends of hollow cylinder means, the piston having a head facing towards the first end of the cylinder means and carrying a piston rod slidingly and sealingly extending outwardly of the first end of the cylinder means, the interior of the cylinder means being filled with gas under pressure and the piston dividing the interior of the cylinder means into a first chamber defined at least in part by the head of the piston and a second chamber through which the piston rod extends;

piston by-pass means comprising first interconnection means continuously interconnecting points in the first and second chambers which are separated by a predetermined part, only, of the stroke of the piston, whereby to allow transfer of gas pressure from the second chamber to the first chamber as the gas pressure in the first chamber moves the piston over the said predetermined part of the stroke and moves the piston rod from an inner piston rod position towards an outer piston rod position more outwardly of the cylinder means, and whereby gas pressure transfer can no longer take place through the first interconnection means when the piston has moved outside the predetermined part of the stroke and movement of the piston and piston rod thus ceases, and second interconnection means continuously connecting further points in the first and second chambers which are separated by a second predetermined part, only, of the stroke of the piston, whereby to allow transfer of gas pressure from the second chamber to the first chamber as the piston moves over the said second predetermined part of the stroke and moves the piston rod from the inner piston rod position towards the outer piston rod position, and whereby gas pressure transfer can no longer take place through the second interconnection means when the piston has moved outside the second predetermined part of the stroke and movement of the piston and piston rod thus ceases;

gas flow control means operable from outside the cylinder means and switchable between a first condition in which it permits gas pressure transfer between the first and second chambers when the piston is outside the predetermined part of the stroke, so that the gas pressure inside the cylinder means moves the piston rod towards the outer piston rod position, and a second condition in which it blocks such gas pressure transfer, the gas flow control means further comprising means operative in the said second condition to block transfer of gas pressure between the first and second chambers when the piston is outside both said predetermined parts of its stroke and operative in the first condition to allow such gas pressure transfer so that the gas pressure in the cylinder means moves the piston rod further towards the outer piston rod position; and one-way valve means permitting gas pressure transfer between the first chamber and the second chamber when the piston rod is moved towards the inner piston rod position by an externally applied force, the one-way valve means comprising sealing means carried by the piston and acting between the piston and the cylinder means and operative to provide a gas seal therebetween when the piston rod is moving outwardly of the cylinder means towards the outer piston rod position and to allow the passage of gas between the piston and the cylinder means when the piston rod is moving in the opposite direction.

3. A gas compression spring, comprising cylinder means having a hollow closed interior with first and second longitudinally displaced ends, a piston longitudinally slidable within the cylinder means along a stroke extending between the first and second ends thereof, the piston having a head facing the first end and carrying a piston rod slidingly and sealingly extending outwardly through the second end of the cylinder means, the interior of the cylinder means being filled with gas under pressure and the piston dividing the interior of the cylinder means into a first chamber defined at least in part by the head of the piston and a second chamber through which the piston rod extends;

first gas flow means mounted on the cylinder means and providing at least one restricted gas flow path which extend, along a predetermined part of the stroke of the piston between the two chambers, the predetermined part of the stroke excluding an inner end region of the cylinder means adjacent the first end of the cylinder means, whereby when the piston is overlapped by the said at least one gas flow path, gas pressure transfer from the second chamber to the first chamber takes place through said at least one gas flow path as the gas pressure in the first chamber moves the piston in a direction moving the piston rod towards an outer piston rod position more outwardly of the cylinder means, and whereby gas pressure transfer can no longer take place through said at least one gas flow path when the piston has moved inwardly into the inner end region of the cylinder means and the piston rod thus becomes locked against outward movement;

second gas flow means controllably switchable between open and closed conditions and operative when in an open condition to provide a by-pass gas flow path for by-passing the piston when the piston is in the inner end region of the cylinder means and thus providing a by-pass connecting the first and second chambers;

control means operable from outside the cylinder means and connected to the second gas flow means to switch the latter between the open condition in which it permits the gas pressure transfer between the first and second chambers when the piston is in the inner end region of the cylinder means so as to allow the gas pressure itself to move the piston rod towards the outer piston rod position, and a second condition in which it blocks such gas pressure transfer; and one-way valve means permitting gas pressure transfer between the first chamber and the second chamber when the piston is moved towards the inner piston rod position by an externally applied force, the one-way valve means comprising sealing means carried by the piston and acting between the piston and the cylinder means and operative to provide a gas seal therebetween when the piston is moving outwardly of the cylinder means towards the outer piston rod position and to allow the passage of gas between the piston and the cylinder means when the piston rod is moving in the opposite direction.

* * * * *